Nov. 12, 1968 M. S. SHATAVSKY 3,410,464

PHONOGRAPH RECORD PLAYER CARTRIDGE WITH GROOVE CLEANING ATTACHMENT

Filed Oct. 31, 1966

INVENTOR.
MORRIS S. SHATAVSKY

BY

OSTROLENK, FABER, GERB & SOFFEN

ATTORNEYS

United States Patent Office 3,410,464
Patented Nov. 12, 1968

3,410,464

PHONOGRAPH RECORD PLAYER CARTRIDGE WITH GROOVE CLEANING ATTACHMENT

Morris S. Shatavsky, White Plains, N.Y., assignor to Sonotone Corporation, Elmsford, N.Y., a corporation of New York Filed Oct. 31, 1966, Ser. No. 590,605
10 Claims. (Cl. 274—47)

This invention relates to a means for automatically cleaning phonograph record grooves during the playing of record and more particularly, to a phonograph record groove cleaning attachment which is mounted to the cartridge or tone arm in a manner having a minimal effect on the stylus tracking force.

The operator of a phonograph seeks to obtain the maximum fidelity of sound reproduction with a minimum of wear of his records' grooves. To best achieve these aims, the grooves of his records must be free of dust, lint or other abrasive particles when the playing needle or stylus moves through them. Hence, phonographs have been made with record groove cleaning attachments affixed to them so that foreign substances can be cleaned out of the grooves before the stylus moves through them.

Prior art phonograph record groove cleaners are of three basic types. The first type, as shown in French Patent No. 1,232,976, employs an arm separate from the cartridge carrying tone arm to carry the groove cleaning means. This requires the manufacturer to install extra equipment and the phonograph operator to take the extra step of positioning a separate arm to insure his record grooves are kept clean.

In a second type, as shown in U.S. Patent No. 2,340,806, a groove cleaning means is fixedly mounted on the stylus carrying cartridge. In a third type, as shown in U.S. Patent No. 2,295,798, a groove cleaning means is fixedly mounted on the cartridge carrying tone arm. The second and third types have similar disadvantages. Being fixedly mounted, the vertical tracking force from the tone arm, determined by unbalanced or spring generated force, or both, is taken up in part by the groove cleaning means, thus subtracting from the vertical stylus force which would otherwise be applied to the stylus tip in contact with the record surface. Since the cleaning means goes through wear and stiffness change, a fixedly mounted cleaning means will have variation in its vertical force take up which will reflect variation in the stylus tip tracking force on the record.

The tone arm must be counterbalanced to ensure that a correct pressure will be applied to the record grooves. Consequently, if the cleaning means is permanently removed, the stylus tracking force will be increased and there will no longer be optimum fidelity of sound reproduction and minimal wear on the record grooves.

The instant invention overcomes the drawbacks described above by providing a cleaning attachment having a shaft which passes freely through an aperture in the stylus carrying cartridge or in the forward end of the cartridge carrying tone arm. A cleaning member is secured to one end of the shaft and the other end has a restraining cap member. As the record moves, the groove cleaning attachment engages and slides along the record surface. The restraining cap member keeps the shaft from sliding out of the aperture.

In an alternate form, the restraining cap member can be replaced with a second cleaning member, whereby when the first member becomes worn, the positions of the cleaning members can be switched to provide a new cleaning member for engaging the record surface.

The aperture through which the shaft passes is generally perpendicular to the plane of the record surface and the shaft is free to translate vertically without taking up any vertical force from the tone arm which is intended for the cartridge stylus tip. Thus, the weight of the groove cleaner falls largely on the record surface, minimizing the effect of the groove cleaner on the stylus tracking force.

Alternatively, the aperture might be tilted at an acute angle from the direction in which the stylus points when it engages the record grooves. A side of the cleaning member would thereby tangentially engage the record surface, and as the record rotated on its turntable, the frictional engagement between the cleaning member and the record surface would cause the cleaning member to roll rather than drag over the surface of the record, which helps sweep the grooves clean.

Accordingly, it is a primary object of the present invention to provide a phonograph record groove cleaning attachment which will have a minimal effect on the stylus tracking force to ensure a minimum of wear on the record grooves and a maximum of fidelity of sound reproduction.

It is another object of the present invention to provide, in combination with a phonograph record player cartridge or tone arm, a record groove cleaning attachment which will have a minimal effect on the vertical tracking force.

It is another object of the present invention to provide, in combination with a phonograph record player cartridge or tone arm, a phonograph record groove cleaning attachment which rolls rather than rubs over the surface and grooves of a phonograph record preventing unnecessary wearing of the grooves or slowing of the record rotation speed.

It is another object of the present invention to provide, in combination with a phonograph record player cartridge or tone arm, a phonograph record groove cleaning attachment which can be attached to the tone arm or to the body of the cartridge.

It is a further object of the present invention to provide a phonograph record groove cleaning attachment wherein a replacement cleaning member is readily available and easily substituted.

It is another object of the present invention to provide a simply constructed phonograph record groove cleaning attachment.

These and other objects of the present invention will become apparent after consideration is turned to the following description of the accompanying drawings in which.

Figure 1:
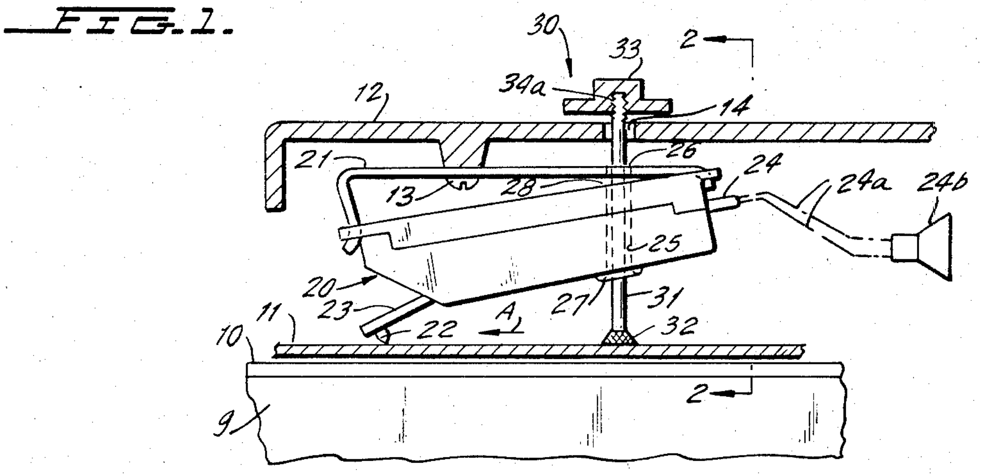
FIGURE 1 is a side view, partially cross-sectioned, of a cartridge mounted to a tone arm showing a first embodiment of the phonograph record cleaning attachment of the instant invention.

Refer to the drawings. FIGURES 1 and 2 illustrate a first embodiment of the present invention. A phonograph 9 has a turntable 10 upon which rests the phonograph record 11 which has a grooved surface. The phonograph includes a tone arm 12, mounted to a platform (not shown) in the conventional manner. An attaching means, e.g. screw 13, attaches the phonograph record playing cartridge assembly to tone arm 12 by means of the mounting bracket 21 secured to the casing of cartridge 20. Cartridge 20 has a stylus means comprising a tip 22 mounted on stylus rod 23 and is electrically connected to the cartridge output 24, which in turn is connected through wires **24*a* to the phonograph amplifier and sound output schematically represented at 24*b***.

Aperture 25 passes through cartridge 20; aperture 26, through mounting bracket 21; and aperture 14, through tone arm 12. The apertures are positioned in aligned relationship to permit unobstructed passage of the shaft 31 of the hereafter described record groove cleaning attachment 30.

At one end of aperture 25 is collar 27 and at the other end thereof is collar 28, against which collars the shaft 31 of the groove cleaner is pulled when the record 11 rotates.

Groove cleaning attachment 30 is comprised of a shaft 31, having a cleaning member 32 secured, e.g. by cementing, to one end and a restraining cap means 33 secured to the opposite end, e.g. by cooperating screw threads **34*a*. The shaft 31 passes through apertures 25, 26 and 14. Apertures 25, 26 and 14 have diameters slightly greater than that of shaft 31. This permits shaft 31 to move freely inside the apertures. Cleaning member 32 and restraining cap means 33 prevent groove cleaning attachment 30 from sliding out of apertures 25, 26 and 14**.

Figure 3:
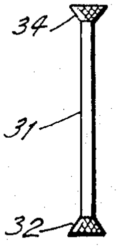
FIGURE 3 is an elevation of an alternate form of groove cleaning attachment.

The restraining means 33 should be light in weight and may typically be constructed of a light-weight plastic material. An alternative form of groove cleaning attachment is shown in FIGURE 3 where the restraining means 33 is replaced by a second cleaning member 34, whereby when the first member 32 becomes worn, the member 34 is available to replace member 32.

The cleaning members 32 and 34 should be comprised of a soft and lightweight substance which will brush dust from the grooves of record 11 without unnecessarily wearing them out. For example, the cleaning members might be comprised of a shaped piece of felt or of a foamed polyurethane or other suitable material. Cleaning members 32 and 34 may be hemispherically, cylindrically, conically or otherwise shaped. The material of which they are comprised has sufficiently rough surfaces to permit the weight of the restraining cap means 33 or member 34, of the shaft 31 and of the cleaning member 32 to cause the member 32 to rub the record surface, cleaning dust, lint, and other foreign substances from the record grooves. As shown in FIGURE 1, the record rotates first past the groove cleaning member 32 and then past the stylus tip 22, that is, the groove cleaner is positioned so that the cleaning member 32 rides behind the stylus tip, so that each groove would be cleaned before the stylus tip went through it.

As seen in FIGURES 1 and 2, in the first embodiment of the instant invention, aperture 25 is shown generally perpendicular to the surface of the record 11 when stylus tip 22 engages the record. If shaft 31 is perpendicular when the stylus tip 22 is contacting the surface of record 11, the bulk of the weight of the groove cleaning attachment 30 bears directly down upon the record 11 itself. Cartridge 20, and, hence, stylus tip 22 only receive the very slight downward component of force exerted by the shaft 31 and the restraining means 33 as the shaft 31 leans against the collars 27 and 28.

In FIGURE 2, which is a cross-sectional view of the cartridge of FIGURE 1 in a plane perpendicular to the axis along the length of the cartridge, the first embodiment of the cleaning attachment 30 is shown generally perpendicular to the surface of record 11. When the record 11 is rotated by turntable 10, cleaning member 32 of the first embodiment of means 30 will drag over the record.

Figure 2A:
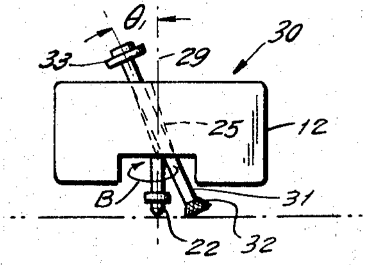
FIGURE 2A is a view of a cartridge in the direction of FIGURE 2 and showing a second embodiment of the instant invention.
Figure 2:
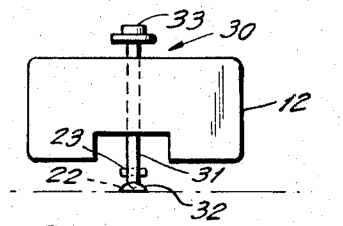
FIGURE 2 is a view of the cartridge of FIGURE 1 shown unmounted, along the line and in the direction 2—2 of FIGURE 1.

FIGURE 2A is a cross-sectional view of a cartridge adapted with the second embodiment of the present invention in a plane perpendicular to the axis along the length of the cartridge 20 and in the direction of view of FIGURE 2. Aperture 25 is inclined at an acute angle $\theta_1$ with respect to the axis 29 of the stylus tip 22. The angle is preferably less than 30°. Because the apeture 25 is tilted, the cleaning attachment 30 is tilted. Thus, at any one time only a portion of the side of cleaning member 32 tangentially contacts the surface of the record 11 and the frictional tangential engagement of the member 32 with the record 11 causes the cleaning member 32 and, hence, the shaft 31 to rotate. Since the aperture is tilted and the cleaning member 32 rolls over the record surface, the member 32 is enabled to more readily lift foreign substances out of the grooves. Since the tilting is only to enable the member 32 to roll, the perture 25 need only be tilted slightly in a plane substantially perpendicular to the axis of the cartridge.

If aperture 25, as viewed in FIGURE 2A, is inclined slightly from the perpendicular, more of the weight of the shaft 31 and restraining means 33 bears down upon the collars 27 and 28 and upon the inside surface of the aperture 25 and is translated into a downward force on the cartridge 20 and the stylus tip 22. If the angle of inclination $\theta_1$ is small, i.e. less than about 30°, the downward component of force is minimized so that the cleaning attachment will have a minimal effect on stylus bearing force. Consequently, aperture 25 should be made as nearly perpendicular to record 11 as possible.

The tilting of aperture 25 causes the weight of the groove cleaning attachment to have only a slight effect on the stylus means tracking force. When the angle of tilt of the aperture 25 is kept to the minimum at which cleaning member 32 is enabled to roll, a negligible amount of weight is applied on the stylus tip 22 by the groove cleaning attachment 30.

As viewed in FIGURE 2A, the member 32 rolls over the record surface a few grooves in front of the stylus. Were aperture 25 moved to the left in FIGURE 2A, member 32 could contact the record surface such that it rolls over the grooves just before the stylus passes through them.

Figure 4:
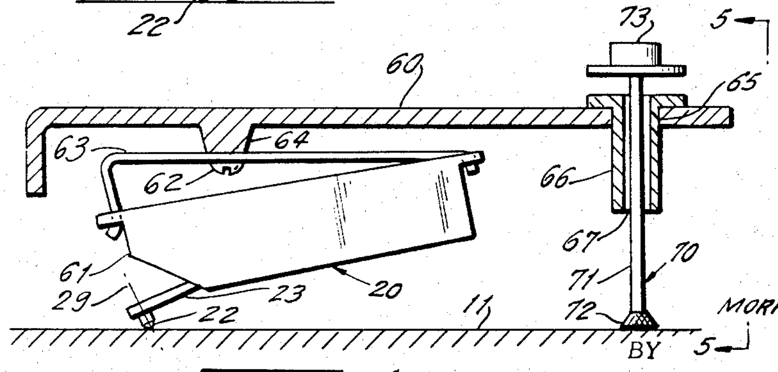
FIGURE 4 is a side view, partially cross-sectioned, of a phonograph tone arm showing a third embodiment of the instant invention.

FIGURE 4 is a side view of a phonograph record player tone arm designed in accordance with the third embodiment of the present invention, in which the phonograph record groove cleaner attachment there shown passes through an aperture in the tone arm itself. The tone arm 60, like the tone arm 12, is mounted to a platform (not shown). A cartridge 61 of the cartridge assembly is secured by screw 62, which passes through the cartridge mounting bracket 63 and into a tone arm threaded recess 64. The cartridge 61, like the cartridge 20, is connected to a sound amplification means and a speaker means (not shown). Stylus 22 engages the grooves of the record 11. The tone arm 60 has an aperture 65 passing through it. Preferably, the aperture 65 is positioned behind the cartridge 61 in order that the hereinafter described groove cleaner attachment 70 can clean the grooves of the record before the stylus 22 passes through them. However, the aperture 65 may also be placed in front of cartridge 61 provided that the cleaning attachment is arranged slightly off the axis of the tone arm assembly or is tilted so that the cleaning member leads the stylus 22 on its path across record 11. Since the material of which the tone arm is comprised is not very thick, a bushing 66 can be inserted in the aperture 65 to act as a support for the cleaner attachment 70. The aperture 67 through the bushing has a diameter greater than the diameter of the shaft 71 of the groove cleaner attachment to permit the shaft to freely move in the aperture 67.

Groove cleaner attachment 70 has a rigid shaft 71 which extends through the aperture 67 in the bushing 66. At one end of the shaft 71 is a groove cleaning member 72 which comes into engagement with the surface of the record 11 when the tone arm 60 is so positioned that the stylus 22 is in engagement with the grooves of the record 11. Restraining cap means 73 is mounted at the other end of shaft 71 to prevent the groove cleaner attachment from falling out of the aperture 67 when the tone arm is moved away from the record 11. The materials of which the cleaning member 72 and restraining cap member 73 might be comprised are discussed above in connection with the first embodiment of the present invention. The cap member 73 can be replaced with a second cleaning member for reasons discussed above.

In the third embodiment of the present invention, the bushing 66 and, hence, the shaft 71, are substantially perpendicular to the surface of the record 11.

Figure 5:
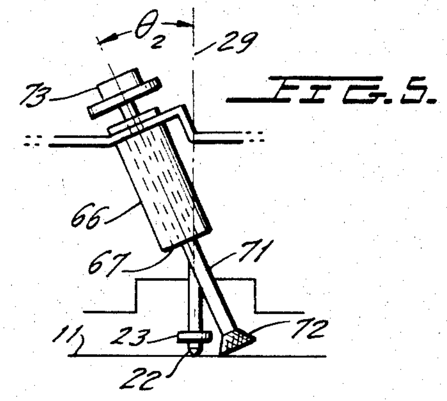
FIGURE 5 is a view of a phonograph tone arm showing a fourth embodiment of the instant invention viewed in the direction 5—5 of FIGURE 4.

In a fourth embodiment of the present invention shown in FIGURE 5, the bushing 66, and, therefore, the aperture 67 and the shaft 71, can be tilted at the angle $\theta_2$ from the axis 29 of the stylus 22 in the manner shown generally with respect to the second embodiment in FIGURE 2A. Specifically, to cause cleaning member 72 to roll over the surface of the record 11, the bushing 66 might be tilted in a plane perpendicular to the axis of the length of the tone arm 60 at an acute angle $\theta_2$, preferably less than about 30°, from the axis of the stylus. The benefits to be obtained by having the shaft 71 vertical or tilted are discussed above in connection with the first and second embodiments.

The third and fourth embodiments of the present invention provide all the benefits of applicant's novel groove cleaner attachment without requiring that stylus containing cartridges be specially manufactured to contain applicant's groove cleaner attachment. Rather, tone arms, such as tone arm 60, can be adapted either at the time they are manufactured or at some time later in the field to receive a groove cleaner attachment 70.

Since in all of the embodiments of the present invention recited herein the groove cleaner attachment is made a part of the tone arm or cartridge, no separate arm is needed to hold the groove cleaner, which would require the extra step by the record player operator of placing the groove cleaner arm over the record. As the groove cleaning attachment of the instant invention wears out or if it is removed, the change will have a minimal effect on the tracking force exerted on the stylus tip 22 and, thus, will not affect the speed of wearing out of the grooves on the record 11 or the fidelity of reproduction of the sound. In addition, when the aperture, in which is positioned the shaft of the groove cleaner attachment, is tilted, the groove cleaner member is enabled to roll over the record surface minimizing rubbing of the grooves.

Although there have been described various preferred embodiments of this novel invention, many variations and modifications will now be apparent to those skilled in the art.

The embodiments of the invention in which an exclusive privilege or property is claimed are described as follows:

1. In combination, a phonograph record player tone arm assembly comprising a tone arm and a cartridge assembly which has a stylus means attached thereo; and a record groove cleaner attachment therefor,
  said groove cleaner attachment comprising a cleaning member and a shaft; said cleaning member being mounted on a first end of said shaft;
  an aperture in said tone arm assembly; said shaft extending into said aperture; said aperture being of such width that said shaft moves freely therein; first means for preventing said shaft from falling out of said aperture;
  said stylus means and said cleaning member being positioned to be able to engage a phonograph record;
  said groove cleaner attachment being so positioned that when said stylus means and said cleaning member engage the phonograph record, said shaft is freely movable in said aperture, such that said cleaner attachment exerts a minimal downward force component on said tone arm assembly and thereby has a minimal effect on stylus means tracking force.

2. The combination of claim 1 in which said aperture is positioned in said cartridge assembly so as to be substantially perpendicular to the plane of a phonograph record when said stylus means is brought into engagement with the record.

3. The combination of claim 1 wherein said stylus means has a stylus tip for engaging a record;
  said stylus tip having a first axis;
  said cartridge assembly having a second axis along its length;
  said aperture being inclined at an angle from said first axis in a plane substantially perpendicular to said second axis.

4. The combination of claim 2 in which said cartridge assembly comprises a cartridge;
  said stylus means being mounted to said cartridge;
  said aperture passing through said cartridge.

5. The combination of claim 3 in which said cartridge assembly comprises a cartridge;
  said stylus means being mounted to said cartridge;
  said aperture passing through said cartridge.

6. The combination of claim 2 wherein said shaft has a second end and said groove cleaning attachment includes a second cleaning member; said second member being mounted to said second end of said shaft.

7. The combination of claim 3 wherein said shaft has a second end and said groove cleaning attachment includes a second cleaning member; said second member being mounted to said second end of said shaft.

8. The combination of claim 1 in which said aperture is positioned in said tone arm so as to be substantially perpendicular to the plane of a phonograph record when said stylus means engages the record.

9. The combination of claim 1 wherein said tone arm has a first axis along its length;
  said stylus means having a stylus tip for engaging a phonograph record, said stylus tip having a second axis; said aperture being inclined at an angle from said second axis in a plane perpendicular to said first axis.

10. The combination of claim 9 wherein said shaft has a second end and said groove cleaning attachment includes a second cleaning member; said second member being mounted to said second end of said first shaft.

References Cited

UNITED STATES PATENTS 2,773,692 12/1956 Dunnavan ----------- 274—47

FOREIGN PATENTS 162,495 5/1921 Great Britain.

LEONARD FORMAN, *Primary Examiner.*

FELIX J. D'AMBROSIO, *Assistant Examiner.*